(12) United States Patent
Valencia

(10) Patent No.: US 8,048,190 B2
(45) Date of Patent: Nov. 1, 2011

(54) COMPOSITION OF LIQUID FERTILIZER

(76) Inventor: Jose Luis Miranda Valencia, Guanajuato (MX)

( * ) Notice: Subject to any disclaimer, the term of this patent is extended or adjusted under 35 U.S.C. 154(b) by 376 days.

(21) Appl. No.: 12/162,968

(22) PCT Filed: Dec. 19, 2007

(86) PCT No.: PCT/MX2007/000157
§ 371 (c)(1),
(2), (4) Date: Jul. 31, 2008

(87) PCT Pub. No.: WO2009/078691
PCT Pub. Date: Jun. 25, 2009

(65) Prior Publication Data
US 2010/0154498 A1   Jun. 24, 2010

(51) Int. Cl.
*C05C 9/00* (2006.01)
(52) U.S. Cl. .................................. 71/28; 71/30; 71/64.1
(58) Field of Classification Search .............. 71/64.11, 71/28, 30, 64.1
See application file for complete search history.

(56) References Cited

U.S. PATENT DOCUMENTS

| | | | |
|---|---|---|---|
| 5,201,930 A | | 4/1993 | Campbell et al. |
| 5,698,001 A * | | 12/1997 | Keenportz ..................... 71/24 |
| 6,110,866 A * | | 8/2000 | Walker .......................... 504/118 |
| 2007/0095118 A1* | | 5/2007 | Evers et al. ..................... 71/28 |
| 2007/0264419 A1* | | 11/2007 | Tuli ................................ 426/651 |
| 2007/0280919 A1* | | 12/2007 | Gorton .......................... 424/94.3 |
| 2009/0318293 A1* | | 12/2009 | Marks ............................ 504/136 |

FOREIGN PATENT DOCUMENTS

| | | |
|---|---|---|
| CN | 1436758 A | 8/2003 |
| CN | 1483710 A | 3/2004 |
| EP | 0998850 A1 | 5/2000 |
| EP | 1004560 A2 | 5/2000 |
| HU | 45468 A2 | 7/1988 |
| JP | 61136583 A | 6/1986 |
| JP | 9100207 A | 4/1997 |
| WO | WO 9511205 A1 | 4/1995 |
| WO | WO 2006065133 A2 | 6/2006 |

OTHER PUBLICATIONS

Seethalakshmi, C. and Padmaja, C.K.; "Efficacy of *Aloe vera* (L.) Leaf Powder in Promoting Growth and Yield of Clusterbean (*Cyamopsis tetragonoloba* L.)"; Research on Crops, 2006, vol. 7, No. 3, pp. 676-679; ISSN 0972-3226.

Kiruba, S. et al.; "Traditional Pest Management Practices in Kanyakumari District, Southern Peninsular India"; Indian Journal of Traditional Knowledge, 2006, vol. 5. No. 1, pp. 71-74; ISSN 0972-5938.

International Patent Application PCT/MX2007/000157; International Search Report and Written Opinion of ISA/ES; Oficina Espanola de Patentes y Marcas; Apr. 21, 2008.

* cited by examiner

*Primary Examiner* — Wayne Langel
(74) *Attorney, Agent, or Firm* — Carr LLP

(57) ABSTRACT

This invention refers to a liquid fertilizer of organic and mineral origin where sabila and humic acid are used as sources of organic matter, to which may be added micronutrients iron, zinc, copper, manganese, boron, calcium and magnesium in the form of a soluble compound; furthermore, a chelating agent and a surfactant to make the nutrients more assimilable for the crops may be added. The invention consists of a liquid organic-mineral fertilizer whose organic base is sabila extract and/or humic acid; and the mineral elements conform to diverse added salts so that the fertilizer contains the essential micronutrients for all soil type (iron, zinc, copper, manganese, boron, calcium and magnesium). Furthermore, the invention contains a chelating agent and a surfactant to improve the assimilation of the nutrients for the cultivations.

19 Claims, No Drawings

COMPOSITION OF LIQUID FERTILIZER

FIELD OF THE INVENTION

This invention refers to a liquid fertilizer of mineral and organic origin where sabila and humic acid are used as sources of organic matter, to which have been added the micronutrients iron, zinc, copper, manganese, boron, calcium and magnesium in the form of a soluble compound, furthermore of a chelating agent and a surface active agent (surfactant) to make the nutrients more assimilable for crops.

BACKGROUND OF THE INVENTION

The use of fertilizers is essential for the good growth and the high production of crops. Of the basic nutrients that the plants need to have a healthy development, most of the crops and soils require large quantities of nitrogen (from $NO_3^-$ or $NH_4^+$), phosphorous (from $H_2PO_4^-$), and potassium (from $K^+$) (Wichmann, W., et al, IFA World Fertilizer Use Manual). Such quantities of nitrogen, phosphorous and potassium are provided mainly in the form of mineral fertilizers, already processed from natural or chemically-produced minerals (K. F. Isherwood, 1998, Mineral Fertilizer Use and the Environment, United Nations Environmental Programme Technical Report No. 26). The development and use of the mineral fertilizers since the 1940's have allowed significant increases in the production of the crops.

The damaging effects of mineral fertilizers has been recognized in recent years, despite the importance of such fertilizers. The challenge will be to use mineral fertilizers with more efficiency, and the intergrated management systems of the production provide a path toward rationalization in the use of the inputs. (Fertilizer and the future, by Louise O. Fresco, Assistant Director-General, FAO Agriculture Department,).

The mineral fertilizers sometimes damage the soil. For example, excessive use of chemically synthesized nitrogen can inhibit the natural activity of the microorganisms responsible for adjusting the nitrogen and, therefore, diminish the natural fertility of the soil. The extensive use of mineral fertilizers can cause contamination. For example, the loss of nitrogen and phosphate by the fertilizers due to erosion could contaminate soils and underground waters.

In the search for a solution to these problems, some agricultural engineers have again started the use of organic fertilizers and fertilizers consisting of a mixture of minerals and organics. The organic-minerals fertilizers are produced by combining some minerals with organic matter coming mainly from plants. Engineers have had very satisfactory results as to the enrichment of the plants and the soil.

Today, the organic fertilizers and the organic-minerals fertilizers can be made from various raw materials. Some of the first materials used were municipal organic residuals, due to their low cost and great macronutrients content, such as in the case of the U.S. Pat. Nos. 6,828,137 and 6,352,569. Other organic-based fertilizers used manure from cows, horses, chickens, lambs or pigs, as in U.S. Pat. No. 6,852,142. Although the organic matter coming directly from plants is one of the most abundant, few fertilizers use this source as the base of their formulation. The present invention may use in the production of a fertilizer the sabila as one source of organic matter, in addition to other nutrients, for its production.

DESCRIPTION OF THE INVENTION

The present invention intends to provide an organic fertilizer that promotes the growth of crops and improves the quality of the crop and soil characteristics.

The present invention may consist of a liquid fertilizer that may have organic matter and lignin, amino acids, nitrogen, iron, zinc, manganese, copper, boron, calcium, magnesium, humic acid, a chelating agent, a surfactant and a preservative.

| COMPONENT | CONCENTRATION (%) |
|---|---|
| Organic matter | 25-35 |
| Lignin | 0.5-5 |
| Amino acids | 0.01-2 |
| Nitrogen | 1-6 |
| Iron | 1-6 |
| Zinc | 0.5-5 |
| Manganese | 0.5-5 |
| Copper | 0.1-2 |
| Boron | 0.01-3 |
| Calcium | 0.01-3 |
| Magnesium | 0.01-3 |
| Humic acid | 10-30 |
| Chelating Agent | 1-6 |
| Surface active agent | 1-6 |

The percentages in weight shown in the table above are based on the total weight of the fertilizer, where the organic matter may be obtained from the sabila extract (*Aloe Vera*) and from the humic acid, the lignin of the sabila extract. The nitrogen source may be from urea; the iron may be from ferrous sulphate monohydrate; the zinc may be from the zinc sulphate monohydrate; the manganese may be from manganese sulphate monohydrate; the copper may be from copper sulphate heptahydrate; the boron may be from liquid fertilizer of Boron to 10%; the calcium may be from the liquid fertilizer of calcium nitrate; the magnesium may be from magnesium sulphate; the chelating agent may be epoxidized soybean oil; the surfactant may be nonylphenol polyglycol ether, and the preservative may be formalin.

The use of the sabila extract may be one of the essential characteristics of the invention, since the sabila extract may provide to the fertilizer organic matter and lignin of great importance for the soils, and also provide other essential nutrients such as calcium, potassium, sodium, aluminum, iron, zinc, copper, chromium, phosphor and amino acids.

Furthermore, the use of the extract of sabila as a source of natural organic matter may be combined with concentrated liquid humic acid (humus) that contributes better enrichment to the soil in organic matter and provides more assimilation and exchange of nutrients in the soil.

DESCRIPTION OF THE SABILA PLANT

The genus *Aloe* belongs to the tribe Aloineae of the family Liliaceae, which is essentially of African origin, but some of the genus which comprises the tribe can be found in any other part of the world, either because of natural dispersion, or because the other genus were introduced for the multiple advantages of the plant and are commercially cultivated.

Approximately 320 species of the genus *Aloe* have been described, among which are highlighted the sabila (*Aloe Vera* (L) Burm.) (described in Table 1 below). The most frequently cultivated species in Mexico are *A. Vera* and *A. Ferox*.

The plants of this species are herbaceous with short shafts, vivacious, perennial, with rosetted aspect (basal rosettes) of grizzly green colour that presents reddish stains by prolonged exposure to the sun. In their mature stage, the plants may end up measuring 65-80 cm in height.

The roots of the plant are fairly superficial, with scaly structure.

The leaves of the plants are lineal (long and narrow), acuminadas (finished in tip). The margins are thorny and jagged with coriaceous texture (similar to leather, resistant but flexible) and succulent (juicy, fleshy); of 30-60 cm of longitude. Further, the leaves are usually around 30-60 cm in length and cone-shaped packed in a dense rosette with intense colour in variable tones of green.

TABLE 1

Taxonomic clasification

| | |
|---|---|
| Kingdom | Vegetable |
| Division | Embriophyta-siphonogama |
| Subdivision: | Angiosperma |
| Class | Monocotiledoneae |
| Order | Liliales |
| Family | Liliaceae |
| Subfamily | Asfondeloideae |
| Tribe | Aloinaeae |
| Genus | *Aloe* |
| Specie | *vera* |
| Synonymous | *barbadensis* |

The inflorescence is about 1-1.3 m high and simple or barely ramified (one or two lateral ramifications).

The flowers of the plants have a yellow-greenish colour, accompanied by a membranous bract; lanceolate (in form of lance tip, which is longer than it is wide in the middle) having a white, rosy colour, with dark lines about 6 mm long; the perianth segment being cylindrical, curved and erect; stamens having 6 filaments, as long as the perianth anthers, which are oblong and base-fixed; and ovary sessile being oblong and triangular, with several ova in each cavity and having a filiform style and small stigma.

Flowering happens at different times depending on the species, and can happen from the end of the winter until the summer.

The fruit of the plants is a capsule loculisidal or septicidal, having inconsistent walls and conforming to three oblong and triangular loculisidal valves.

This plant presents characteristics such as succulency and its crassulacean acid metabolism that indicates an important adaptation to areas characterized by the shortage of water.

The plants in a wild state or in a generally naturalized state form dense colonies, with the central plant being the mother plant. Each plant produces 20 lateral rosettes on the average (sprouts) which may reach 40 cm in height.

Geographical Localization

In Mexico, the sabila can be found in almost the whole country, as an ornament in domestic gardens and in some places as wild plants. They may also be grown in plantations.

Particularly, in the states of San Luis Potosí, Hidalgo, Tamaulipas and Guanajuato, the wild colonies of sabila are larger. However, the natural populations of this genus have not been defined and quantified in Mexico.

For their ease of adaptation and their properties of the plant, the sabila has awakened the interest of cultivation. Plantations have been established in 1,752 hectares of the country, of which 780 (44.5%) are watered by rain water and the remaining ones 972 (55.5%) are watered by irrigation. The distribution of the sabila in cultivation is given in the following table.

| Cultivated surface of sabila by states (ha) | | | | | |
|---|---|---|---|---|---|
| | Watering | % | Storm | % | Total | % |
| San Luis Potosí | — | — | 362 | 46.5 | 362 | 20.66 |
| Tamaulipas | 946 | 97.3 | 418 | 53.6 | 1,364 | 77.85 |
| Nuevo León | 13 | 1.4 | — | — | 13 | 0.74 |
| Zacatecas | 3 | 0.3 | — | — | 3 | 0.19 |
| Guanajuato | 5 | 0.5 | — | — | 5 | 0.28 |
| Chiapas | 5 | 0.5 | — | — | 5 | 0.28 |
| Total | 972 | | 780 | | 1,752 | |

Source: CONAZA, 1991

Previously plantations had been reported in Oaxaca, Yucatán, Sonora, Baja California Sur and Veracruz, but data from these plantations have not been considered in the official information updated in 1993, the situation of such plantations having been ignored.

In the agronomic area, the sabila juice has been used experimentally as a repellent and insecticide against larvas present in some tuberous plants, with very good results. Similarly, experimentation has been reported for the control of viral illnesses in potatoes, presenting an inhibitory action in comparison with other extracts of vegetable origin.

Chemical Composition of the Sabila

The species of the genus *Aloe* contains a mixture of glucosides called collectively Aloin, which is the active principal ingredient of the plant. The aloin content in the plant can vary according to the species, the region and the gathering time.

The main constituent of the Aloin is barbaloin, a pale yellow substance that is soluble in water. Other constituents are emodina isobarbaloin, betabarbaloin and resins. The characteristic scent of the plant is due to traces of an essential oil.

Generally, the proportion of the compounds mentioned before is as follows:

Two yellow brilliant, very active resins, possibly identical, soluble in bicarbonate of sodium, 30%;

A soluble very active resin in bicarbonate of sodium, 6.8%;

Aloin, lightly active, 20.0%;

Emodine, lightly active, 1.5 to 1.8%;

Inactive substances, hidrosolubles, 15.2%; and

Amorphous substances that produce stomach alterations, but that do not rise to a purgative effect, 5.1%.

Different analyses carried out on the plant and its extract have allowed us to know the nature of the substances that compose it. Some of these substances are listed here:

Polysaccharides: glucose, mannose, galactose, xilose, arabinose;

Acids: Glucuronic, citric, succinic, malic;

Enzymes: oxidase, cellulose, bradiquinase, catalase, amilase;

Tannins;

Steroids;

Proteins: only one, not hydrolyze, contains 19 amino acids;

Biogenic stimulative;

Saponin;

Magnesium; and

Esterols: three.

Chemical Composition of the Acibar or Sabila Juice

Acibar is the juice or exudate of the leaves of the sabila when these leaves suffer wounds or practiced incisions. Acibar presents a mucilaginous appearance, glutinous and of dark greenish yellow colour. It has a strong scent and a very bitter flavour.

The contained resin varies from 40 to 80% and is composed of an ester of paracumaric acid and a resinic alcohol called Aloeresinetanol. The content of Aloin is, approximately, 20% and when hydrolyzed the pentosides that it contains, are derived from antraquinone.

The protein content in the juice is low (0.013%), presenting a composition of 18 amino acids, but the juice possesses a great quantity of vitamins and minerals. The vitamins found in the juice are A, C, E, and B-12, carotenes, folic acid, niacin, riboflavin and thiamin. The juice contains the following minerals: calcium, magnesium, potassium, sodium, iron, and aluminum.

The sabila acibar contains 12 enzymes. These enzymes consist of a protein fraction or apoenzyme and a prosthetic group or coenzyme. The enzyme acts forming a complex with the skin (or "substrate"); the part of the protein that unites to this complex becomes an active center. In most of the cases, the action of the enzyme depends on the coenzyme and specifically for the type of substrate (open skin, hairy leather, etc.) of the apoenzyme.

Extraction of the Acibar to Apply it to the Fertilizer

The process for the extraction of the juice, consists of subjecting the leaves of *Aloe* to a court treatment, mill and compression so that one can extract the largest quantity of possible juice and in this way be able to obtain the best use in the liquid fertilizer and in turn in the application to the field.

This process comprises the following steps:
a) Selecting the leaves, which should be young leaves that have not been dried so that the leaves are richer in nutrients;
b) Cutting the thorns and examining the leaves for dry leaves or leaves in bad condition;
c) Washing the selected and well-cut leaves well with detergent;
d) Washing with water to wash away the detergent;
e) Blunting the leaves (manual);
f) Cutting (manual);
g) Milling with industrial blender;
h) Filtering with mesh of #110;
i) Filtering with mesh of #325;
j) Adding the obtained juice to the previously formulated fertilizer; and
k) Packing the fertilizer into drums of 19 liters for sale and distribution.

When an abundant quantity of organic matter is introduced in a soil where the concentration of materials that are difficult to assimilate is greater than the easily degradable ones, immediately a great change takes place. The multiplication of the micro organisms of the soil suddenly increases in a prodigious way, in which a quick liberation of energy takes place in form of cations and anions, and a great release of carbonic anhydride. Finally, as the easily assimilable energy is used and the nutritional reserves diminish, the microbial activity descends gradually. At this point simple products like nitrates, sulphates and humus are in the soil. (Buckman and Brady, 1991, Naturaleza y Propiedades de los Suelos).

Apart from the great energy contribution and the release of carbon dioxide ($CO_2$), the decomposition of the organic matter gives rise to the liberation of other important simple products such as carbon (in the form of $CO_2$, carbonates and bicarbonates), nitrogen (in the form of nitrates and ion ammonium), sulphur (in the form of sulphates) and phosphorous (in the form of phosphates).

Another major product is dissolved organic humus, which is a complex mixture of compounds made from stable materials that have been modified only by decaying plants or synthesized microbial compounds with interspersed decaying organisms. The humus, when it is saturated with $H^+$ ions, increases the assimilation of certain bases, such as calcium (Ca), potassium (K) and magnesium (Mg); being the humus-H that acts like ordinary acid and reacts with minerals of the soil in the form required to extract their bases. (Buckman and Brady, 1991, Naturaleza y Propiedades de los Suelos).

The lignin is one of the main compounds of the organic matter of the humus and the lignin also plays an important role in the soil. Because the lignin are more resistant than other compounds they spread to persist in modified condition in the soil. The lignin is partially oxidized and the groups responsible for the cationic exchange increase in number.

The relationship of the micronutrients is of supreme importance when speaking of fertilizers. For example, an excess of copper (Cu), manganese (Mn) or zinc (Zn) can induce a deficiency of iron (Fe), but the manganese (Mn), to a certain degree, helps in the assimilation of iron (Fe). (Mortvedt, J. J., et al, 1982, Micronutrientes en Agricultura). It is for that reason that the proportions of the micronutrients in this fertilizer have been carefully evaluated based on experience in the use of fertilizers.

Another significant characteristic of the fertilizer is the use of a chelating agent. The chelate increases the solubility of the metallic ions and favor the transportation of metallic ions inside the plant. Furthermore, after binding to the metallic ion and later on depositing the metallic ion in the place where the plant requires it, the organic part of the chelate returns to dissolve more ions, which makes the use of the micro nutrients in the soil more prolonged.

Use of surfactant is another important aspect of the fertilizer. Use of surfactant results in a high moisturizing ability and a capacity to decrease the superficial surface tension of the water, which facilitates assimilation of nutrients. On the other hand, due to the ability of the surfactant to form emulsions, the surfactant gives stability to the fertilizer.

EXEMPLARY METHODS TO CARRY OUT THE INVENTION

Example 1

To produce 1000 liters of fertilizer one may mix 67 Kg of ferrous sulphate monohidrated, 30 Kg of zinc sulphate monohidrated, 20 Kg of copper sulphate heptahidrated, 35 Kg of manganese sulphate monohidrated, 4 Kg of borax, 20 Kg of magnesium oxide, 70 Kg of chelant agent, 30 Kg of surfactant, 70 Kg of urea, 1 Kg of amino acids, 30 Kg of sabila extract, 200 Kg. of humic acid, 6 Kg. of calcium nitrate, 4 Kg. of formal, 430 Kg. of water and 11 liters of antifoam, until obtaining a homogeneous mixture.

Example 2

The obtained fertilizer may be applied in several ways:
10-30 Liters per hectare (Lt/Ha) may be applied to the ground in bands or spurts.
30-90 Lts/Ha. may be applied to the watering every 14 days or according to those requirements of the cultivation.
In the dripping of 3 to 5 liters dosed in each application of the fertilizer watering program.
When applying 5 Lts/Ha at intervals of 6 days, in a crop of tomato during the development stage of the crop, there were significant differences in the color and size of the leaves of the cultivation of the crop, compared with the leaves of the area where fertilizer was not used.

Applying 5 Lts/Ha at intervals of 6 days corrected deficiencies of microelements in the soil; no effect, however, was observed in the flowering of the crop.

Increasing the dose to 6-10 Lt/Ha with 8 days of rest between each application, it was possible to correct the deficiencies in young leaves; there was good development and color in the foliage, and, also, the change in dosage improved the flowering and the quantity of fruits increased.

What is claimed is:

1. A composition of liquid fertilizer comprising micronutrients, sabila extract from aloe vera, humic acid, and urea.

2. The composition of liquid fertilizer of claim 1, wherein the liquid fertilizer comprises:
   25-35% organic matter;
   0.5-5% lignin;
   0.01-2% amino acids;
   1-6% nitrogen;
   1-6% iron;
   0.5-5% zinc;
   0.5-5% manganese;
   0.1-2% copper;
   0.01-3% boron;
   0.01-3% calcium;
   0.01-3% magnesium;
   10-30% humic acid;
   1-6% chelating agent; and
   1-6% surfactant; and
   wherein the percentages given are based on the percent of total weight of the liquid fertilizer.

3. The composition of liquid fertilizer of claim 2,
   wherein the quantity of organic matter is obtained from the sabila extract from aloe vera and from, the humic acid;
   wherein the lignin is obtained from the sabila extract; and
   wherein the nitrogen source is obtained from the urea.

4. The composition of liquid fertilizer of claim 1, comprising 67 kilograms (kg) of ferrous sulphate monohydrate, 30 kg of zinc sulphate monohydrate, 20 kg of copper sulphate heptahydrate, 35 kg of manganese sulphate monohydrate, 4 kg of borax, 20 kg of magnesium oxide, 70 kg of chelating agent, 30 kg of surfactant, 70 kg of urea, 1 kg of amino acids, 30 kg of sabila extract, 200 kg of humic acid, 6 kg of calcium nitrate, 4 kg of formaldehyde, 430 kg of water and 11 liters of antifoam, for each thousand liters of fertilizer.

5. The composition of liquid fertilizer of claim 2, wherein the nitrogen is urea.

6. The composition of liquid fertilizer of claim 2, wherein the iron is ferrous sulphate monohydrate.

7. The composition of liquid fertilizer of claim 2, wherein the zinc is zinc sulphate monohydrate.

8. The composition of liquid fertilizer of the claim 2, wherein the manganese is manganese sulphate monohydrate.

9. The composition of liquid fertilizer of the claim 2, wherein the copper is copper sulphate heptahydrate.

10. The composition of liquid fertilizer of claim 2, wherein the boron is borax.

11. The composition of liquid fertilizer of claim 2, wherein the calcium is calcium nitrate.

12. The composition of liquid fertilizer of claim 2, wherein the magnesium is magnesium oxide.

13. The composition of liquid fertilizer of claim 2, wherein the chelating agent is soybean oil epoxidized.

14. The composition of liquid fertilizer of claim 2, wherein the surfactant is nonylphenol polyglycol ether.

15. The composition of liquid fertilizer of claim 4, further comprising a preservative.

16. The composition of liquid fertilizer of claim 2, comprising 67 kilograms (kg) of ferrous sulphate monohydrate, 30 kg of zinc sulphate monohydrate, 20 kg of copper sulphate heptahydrate, 35 kg of manganese sulphate monohydrate, 4 kg of borax, 20 kg of magnesium oxide, 70 kg of chelating agent, 30 kg of surfactant, 70 kg of urea, 1 kg of amino acids, 30 kg of sabila extract, 200 kg of humic acid, 6 kg of calcium nitrate, 4 kg of formaldehyde 430 kg of water and 11 liters of antifoam, for each a thousand liters of fertilizer.

17. The composition of liquid fertilizer of claim 15, wherein the preservative is formalin.

18. The composition of liquid fertilizer of claim 4, wherein the chelating agent is epoxidized soybean oil.

19. The composition of liquid fertilizer of claim 4, wherein the surfactant is nonylphenol polyglycol ether.

* * * * *